US010545759B2

(12) United States Patent
Villegas et al.

(10) Patent No.: US 10,545,759 B2
(45) Date of Patent: Jan. 28, 2020

(54) RANDOM EXECUTION OF MULTIPLE DIFFERENT AND INDEPENDENT BRANCHES OF A SENSITIVE COMPUTATION AGAINST VARIOUS ATTACKS

(71) Applicant: Gemalto SA, Meudon (FR)

(72) Inventors: Karine Villegas, Gemenos (FR); Fabrice Perion, Gemenos (FR); Sylvain Leveque, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 248 days.

(21) Appl. No.: 15/533,476

(22) PCT Filed: Nov. 24, 2015

(86) PCT No.: PCT/EP2015/077552
§ 371 (c)(1),
(2) Date: Jun. 6, 2017

(87) PCT Pub. No.: WO2016/091581
PCT Pub. Date: Jun. 16, 2016

(65) Prior Publication Data
US 2017/0344376 A1  Nov. 30, 2017

(30) Foreign Application Priority Data
Dec. 10, 2014  (EP) .................. 14306987

(51) Int. Cl.
*G06F 9/30*   (2018.01)
*G06F 7/58*   (2006.01)
*G06F 21/60*  (2013.01)

(52) U.S. Cl.
CPC .......... *G06F 9/30065* (2013.01); *G06F 7/588* (2013.01); *G06F 21/602* (2013.01)

(58) Field of Classification Search
CPC .... G06F 9/30065; G06F 21/602; G06F 7/588; G06F 21/52; G06F 21/14; G06F 9/4881
(Continued)

(56) References Cited

U.S. PATENT DOCUMENTS 6,327,661 B1   12/2001  Kocher et al.
6,725,374 B1    4/2004  Jahnich et al.
(Continued)

FOREIGN PATENT DOCUMENTS

EP   0 981 115 A2    2/2000
EP   1 239 365 A2    9/2002
WO   WO 99/63696 A1  12/1999

OTHER PUBLICATIONS

International Search Report (PCT/ISA/210) dated Feb. 12, 2016, by the European Patent Office as the International Searching Authority for International Application No. PCT/EP2015/077552.
(Continued)

*Primary Examiner* — Benjamin P Geib
*Assistant Examiner* — Shawn Doman
(74) *Attorney, Agent, or Firm* — Buchanan Ingersoll & Rooney PC

(57) ABSTRACT

A processing unit executes a sensitive computation using multiple different and independent branches that each necessitate a given number of processing unit time units to be executed. Each execution of a sensitive computation includes: generating at least as many identifiers as the number of branches; associating each identifier to a unique branch; generating a random permutation of identifiers, wherein the number of occurrences of each identifier in the permutation is at least equal to the number of processing unit time units in the shortest of the branches; successively determining, wherein the determining includes processing each identifier in the random permutation, which branch to
(Continued)

execute by each successive processing unit time units according to the identifier in the random permutation; and for each identifier of the random permutation, executing a processing unit time unit for the branch determined according to the identifier in the random permutation.

12 Claims, 3 Drawing Sheets

(58) Field of Classification Search
USPC .......................................... 712/241; 726/26
See application file for complete search history.

(56) References Cited

U.S. PATENT DOCUMENTS

| | | | |
|---|---|---|---|
| 2002/0166057 A1 | 11/2002 | Kaminaga et al. | |
| 2008/0209426 A1* | 8/2008 | Kalla ................... | G06F 9/3851 718/103 |
| 2012/0284727 A1* | 11/2012 | Kodialam ............. | G06F 9/4881 718/103 |
| 2014/0165030 A1* | 6/2014 | Chevallier-Mames ...................... | G06F 21/14 717/110 |

OTHER PUBLICATIONS

Written Opinion (PCT/ISA/237) dated Feb. 12, 2016, by the European Patent Office as the International Searching Authority for International Application No. PCT/EP2015/077552.

* cited by examiner

RANDOM EXECUTION OF MULTIPLE DIFFERENT AND INDEPENDENT BRANCHES OF A SENSITIVE COMPUTATION AGAINST VARIOUS ATTACKS

FIELD OF THE INVENTION

The present invention relates to a method to execute a sensitive computation using multiple different and independent branches each necessitating a given number of processing unit time units to be executed.

The use of several different and independent branches in sensitive computations is a common practice in embedded device implementing countermeasures against side channel analysis and fault attacks. It could be present in software or hardware designs that have to master any physical leakage or weakness. The invention enables to strengthen countermeasures by assuring that the countermeasures themselves will not leak.

The invention particularly applies when two branches are used which is a common situation in current implementation.

The invention also pertains to a device for the implementation of said method.

BACKGROUND OF THE INVENTION

It is well known that side channel analysis during a sensitive computation, for example a cryptographic computation, and fault attacks leads to extract secret from a device. Such attacks can use timing measurement, power consumption measurement, electromagnetic emission measurement, fault injection, etc It is always desirable to find efficient ways against physical attacks having a minimum impact, notably in terms of memory footprint and execution time.

In order to counter these attacks, embedded software countermeasures are implemented in secure devices. These software countermeasures are mainly based on one or several of the followings:

Masking sensitive data with random numbers to uncorrelate signals from the sensitive values,
Masking sensitive treatments in order to cancel the possibility to know which branch of a software code has been taken,
Adding some extra code, that assures the correctness of the execution, typically rerun sensitive operations or extra consistent code with control of consistency, etc,
Adding extra code to desynchronize execution in case of loops of execution, which correspond to situations of attack,
Doubling the computation,
Doing the inverse operation,
Adding some fake operations.

In general the implementation of such countermeasure Is costly in term of RAM/ROM footprint and execution time.

In the case of the sensitive computation concerned by the invention the computation is composed by two different and independent branches. In general, one of the sensitive branches is first executed and then the second one.

There exists indeed a need to mask the treatment of such sensitive computation to avoid side channel attacks and to be able to cross-check the coherence of intermediary results depending on the boolean or arithmetic properties of the performed calculations, for example in the case of a DES (M,K) calculation which is equal to the complement of DES(complement M, complement K).

Further alternative and advantageous solutions would, accordingly, be desirable in the art.

SUMMARY OF THE INVENTION

The present invention aims at avoiding, or at least making more difficult the above-mentioned malicious attacks.

The present invention is defined, in its broadest sense, as a method to execute by a processing unit a sensitive computation using multiple different and independent branches each necessitating a given number of processing unit time units to be executed, characterized in that it comprises the following steps of, at each execution of a sensitive computation:

generating at least as many identifiers as the number of branches,
associating each identifier to a unique branch,
generating a random permutation of identifiers, the number of occurrences of each identifier in the permutation being at least equal to the number of central processing unit time units in the shortest of the branches,
by processing each identifier in the random permutation, determining successively the branch to execute by each successive central processing unit time units according to the identifier value,
for each identifier of the random permutation, executing a central processing unit time unit for the branch determined according to the identifier value.

Therefore, the method according to the present invention allows reducing the risks of malicious attacks. At least, the attacks are more complex to carry out for a malicious attacker. The generation of a random order for the identifiers at each execution of the sensitive computation enables to have a sequence of processing time units, typically processing cycles of a central processing unit, dedicated to always a different sequence of branches. Memories are used to store intermediate results of the loops at the end of each time unit and for each of the branches. The reverse engineering of each branch is made more difficult as its realization is mixed with other branch units.

In terms of RAM footprint, the realization of the invention will be a bit more costly than a straight forward execution of each branch but quite equivalent to secure implementation. In terms of ROM footprint, the realization of the invention is simple and advantageous, as some variables could be shared by the branches, for example temporary registers, loops indexes.

Further has to be noted that the invention is easy to construct with an optimum code footprint: indeed globally the code of the branch units is not changed by the invention, it is the way it is called and divided which changes. It is easy to exploit it while assuring correctness with few instructions which organize the succession of the branches units from a buffer containing indexes qualifying each branch and its unit. The invention enables to get a random order execution of branches, different and unpredictable at each execution. The invention reaches this goal with few extra code by building an equilibrated master random number from a random seed assuring by construction, the presence of identifiers of each branch, by selecting branches depending of values of identifiers and advantageously by controlling that each branches have been fully run.

The invention opens the possibility of completely mixing the execution of independent and different branches with high efficiency. The quality of the countermeasure is further high in terms of footprint and performance.

According to an advantageous embodiment, the step of generating identifiers is such that identifiers comprises a value and its complemented value and the step of generating a random permutation is such that, first, a sequence of values as identifiers is generated, this sequence being then completed by complemented values of the sequence.

This specific construction of the random permutation enables to lower the size of the random sequence to be generated. It also enables to insure, by construction, that a same number of cycles are dedicated to each of the branches.

In a first implementation of this embodiment, the sequence is completed by interlacing the complemented values in the previously generated sequence.

Typically the complemented values are here inserted one out of two values. It enables to construct the final permutation in a simple manner adapted to reach the target of the invention.

In a second implementation of this embodiment, the sequence is completed by adjunction of the sequence of complemented values at the end of the sequence of values.

This implementation causes the execution, first of the first set of branches corresponding to the values and, second of the second set of branches corresponding to the complemented values.

In an advantageous application, the sensitive computation comprises different and independent branches of a cryptographic algorithm.

The invention is particularly adapted to protect such algorithm that manipulates sensitive data and that needs to be optimized in terms of performance.

In a particularly interesting application, the sensitive computation is a countermeasure rerunning or implementing extra code to assure the correctness of the execution of at least one of the multiple branches.

Such countermeasures are often used in cryptographic algorithms. However, with the current implementation, they are generally leaking in case of attacks. The application of the invention to such countermeasures which is uses several independent and different branches enables to avoid such leakage.

According to an advantageous feature, one of the branches being of different length, the method comprises a preliminary step of completing the shortest branches with additional processing unit cycles to equilibrate.

Such preliminary step enables to have the same length for each branch in terms of CPU cycles which permit the application of the invention on the whole set of loops in all branches.

According to a specific feature, the method of the invention further includes the step of counting the number of executed processing unit time units.

Such a feature enables to check at the end of the sensitive computation that a number of time units corresponding to the sum of the number of time units in each of the branches has been reached.

According to another specific feature of the invention, the method further includes the step of independently counting, for each of the branches, the number of executed processing unit time units.

This feature enables to track each branch independently. It can be useful to detect fault attacks that enable to jump part of code. It can be done, for example, by incrementing some different tracers each time a branch is run. It is so easy to detect at the ends of the execution that all branches have been taken, the correct number of times. Any fault attacks that succeeds to jump part of code would be detected.

According to a preferred embodiment, said sensitive computation using two different and independent branches each necessitating a given number of processing unit cycles to be executed, the method is characterized in that it comprises the following steps of at each execution of the sensitive computation:
  generating a random number as a succession of bits, the number of bits in the random number being at least equal to the number of processing unit cycles in the shortest of the branches,
  doubling the length of the random number using complemented bits of the generated random number to construct a master random number,
  by processing the master random number bit after bit, determining successively which one of the branches to execute by each successive processing unit cycles depending on the 0 or 1 value of each bit of the master random number, each value being associated to one of the two branches,
  for each bit of the master random number, executing a processing unit cycle for the branch determined according to the bit value.

This embodiment corresponds to a common situation where only two branches are used in the sensitive computation. The construction of the master random used as permutation is original and very advantageous as it necessitates the generation of a random of only half of the size of the number of time units in the shortest branch while insuring that the whole set of necessitated time units are processed for both branches.

In an advantageous embodiment, both branches necessitating the same number of processing unit cycles, the number of bits of the generated random number is equal to the number of processing unit cycles in one branch.

This embodiment corresponds to the case where branches are of the same size.

According to an advantageous feature, the method further includes the step of counting the number of scanned bits in the master random number.

This feature is a very simple way to track the execution of the whole sensitive computation.

The present invention also relates to a device comprising a processing unit to execute a sensitive computation using multiple different and independent branches each necessitating a given number of processing unit time units to be executed, said device further comprising an identifier generator to generate at least as many identifiers as the number of branches, each identifier being associated to a unique branch, said processing unit being able to compute a random permutation of identifiers, the number of occurrences of each identifier in the permutation being at least equal to the number of central processing unit time units in the shortest of the branches,
  said processing unit processing each identifier in the random permutation, to determine successively the branch to execute by each successive central processing unit time units according to the identifier value and, for each identifier of the random permutation, executing a central processing unit time unit for the branch determined according to the identifier value.

Such a device able to implement the invention presents a great protection against attacks as no correlation can be done by an attacker between several executions of the same sensitive computation. Reverse engineering of code executed is also made harder than classical approach. Moreover, even if the code was accessible for reading, it does not reveal what will be the final execution.

In a preferred embodiment, the device comprises a processing unit to execute a sensitive computation using two different branches each necessitating given number of processing unit time units to be executed, said device further comprising or being connected to a random number generator to generate a random number as a succession of bits, the number of bits in the random number being at least equal to the number of processing unit time units in the shortest of the branches, said processing unit being able to compute the complement of the given random number, said processing unit processing, bit after bit, the successive bits of the random number and of the successive complemented bits of the generated random number, this succession of bits and complemented forming a said master random number, to determine successively which one of the branches to execute by each successive processing unit time units depending on the 0 or 1 value of each scanned bit and, for each bit of the master random number, executing a processing unit time unit for the branch determined according to the bit value.

This embodiment corresponds to a common case where two independent and different branches are used in an algorithm.

To the accomplishment of the foregoing and related ends, one or more embodiments comprise the features hereinafter fully described and particularly pointed out in the claims.

BRIEF DESCRIPTION OF THE DRAWINGS

The following description and the annexed drawing set forth in details certain illustrative aspects and are indicative of but a few of the various ways in which the principles of the embodiments may be employed. In the drawings.

DETAILED DESCRIPTION OF EMBODIMENTS OF THE INVENTION

Figure 1:
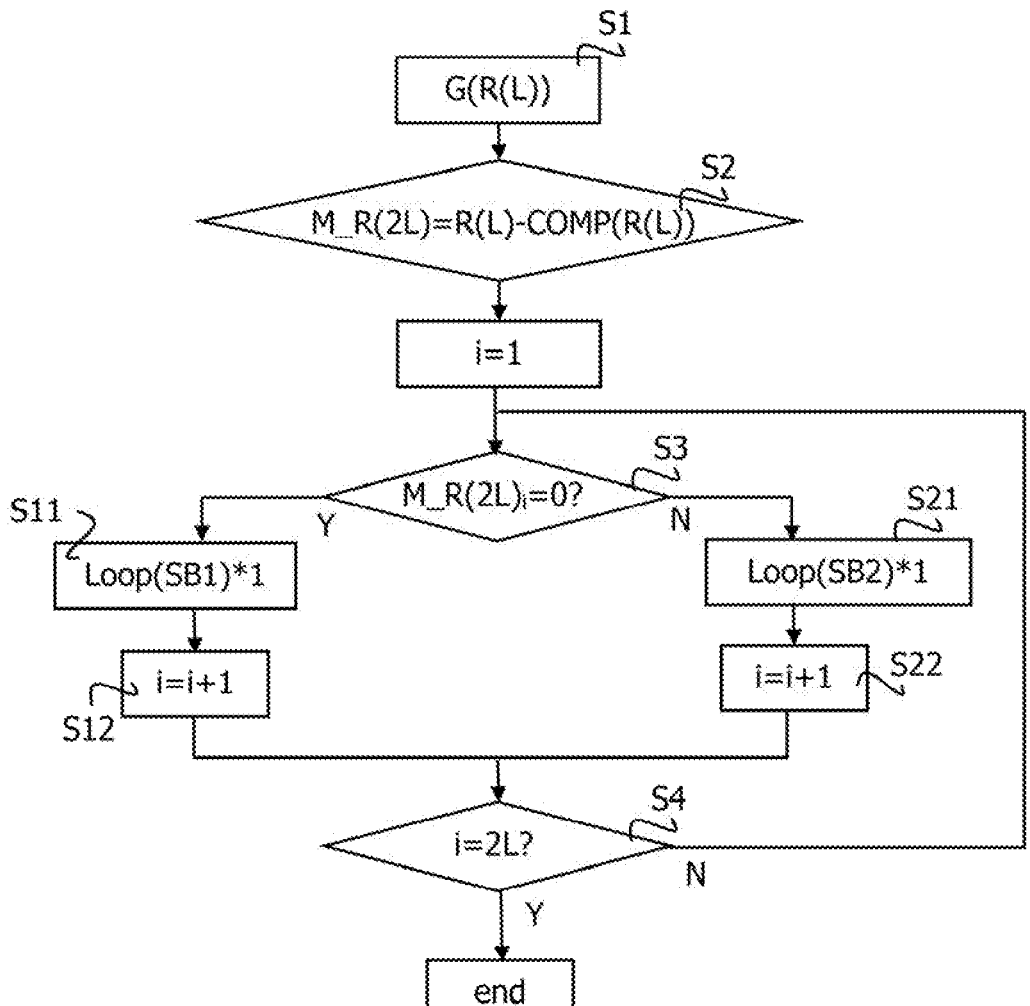
FIG. 1 is a flowchart representing the method of the invention.

For a more complete understanding of the invention, the invention will now be described in details with reference to the accompanying drawings. The detailed description will illustrate and describe what is considered as a preferred embodiment of the invention in which the invention may be practiced, i.e. a situation where the sensitive computation comprises two independent and different branches. This embodiment is described in sufficient details to enable those skilled in the art to practice the invention. It should of course be understood that various modifications and changes in form or details could readily be made without departing from the scope of the invention. In particular, any reference signs in the claims shall not be construed as limiting the scope of the invention defined in the appended claims. The wording "comprising" does not exclude other elements or steps. The wording "a" or "an" does exclude a plurality. For clarity, only those elements and steps which are useful to the understanding of the present invention have been shown in the drawings and will be described.

FIG. 1 schematically shows a method of the invention to execute a sensitive computation using two different and independent branches SB1 and SB2. In the example shown on FIG. 1, the branches necessitate the same given number L of processing unit cycles. If the two branches do not necessitate the same number of cycles, the shortest one is advantageously completed with unspecific operations in order to reach the same number of cycles. Otherwise in FIG. 1 L will be the number of cycles necessitated by the shortest branch. The remaining of the longest branch will then be done after the method of execution of the invention.

Such sensitive computation can for example be a cryptographic algorithm, the structure of which being composed by two different and independent branches, typically RIPEMD160 hash algorithm, etc. It can also be a countermeasure that reruns or implements equivalent extra code to assure the correctness of the execution, typically DES/~DES algorithm, Mix AES Encryption/Decryption, KeySheduling of Masked Data, then Mask, etc. Branches will be different as they will not operate on the same data. They are independent as no calculation of one branch is used for another branch.

It is noted here that the independency of the branches is necessary as, if it is not the case, there will be a dependency between the two branches and the full permutation of the execution, as requested by the invention, will not be possible. Indeed, with the invention, the possibility to completely executing one of the branches before the second one being executed should be possible. Any dependency of the branches is thus excluded.

In a first step S1, a random number R of length L is generated. In a second step S2, this random number R(L) is completed with its complemented bits, noted COMPL(R(L)) in the figure. A master random number M_R having a length of 2L is thus obtained.

Then each successive bits i of the master random number M_R are processed successively as schematically shown on FIG. 1. Starting by the bit, 1 to the bit 2L, in a step S3, it is checked if the current bit M_R(2L)i is equal to 0 or not.

If yes (case Y), a processing unit cycle Loop is used to perform operations of the first branch SB1 in a step SB11. Then the index for the bit of the master random number is incremented in a step S12.

If no (case N), a processing unit cycle Loop is used to perform operations of the second branch SB2 in a step S21. Then the index for the bit of the master random number is incremented in a step S22.

The structure of the master random number M_R enables to insure that a same number of loops are dedicated to the two branches as, by construction, it contains as many 0 as 1.

In a step S4, it is tested if the value of i has reached the 2L value. If yes (cage Y), the execution of the sensitive computation is ended. If no (case N), The method is looped at step S3 where the value of the ith bit is checked.

Figure 2:
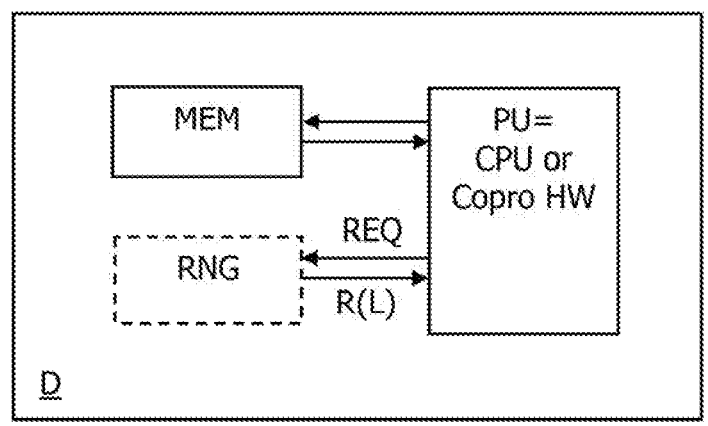
FIG. 2 schematically represents a device of the invention.

FIG. 2 schematically shows a device D of the invention. It comprises a processing unit PU. This processing unit PU can be a central processing unit CPU or a hardware coprocessor, typically one of the crypto-processor type.

For the invention to apply, the processing unit 1 is intended to execute a sensitive computation using two different branches each necessitating a given number of processing unit cycles to be executed.

The device D is further comprising a random number generator RNG. In another variant of the invention, the device D does not comprise the generator RNG itself but is connected to such a generator RNG to retrieve a random number when needed. It is the reason why this entity is represented with dashed lines.

When an execution of the sensitive computation is triggered, the processing unit PU is sending a request REQ to the random number generator RNG. The random number generator RNG is used to generate a random number R(L) as a succession of bits, the number of bits in the random number R(L) being at least equal to the number (L) of processing unit cycles in the shortest of the branches. The random number R(L) is then transferred to the processing unit PU.

The processing unit PU is able to compute the 2's complement of the given random number by complementing its bits of the random number R(L) with the succession of L bits, noted COMP(R(L)). This succession of bits and its complemented ones forms a said master random number M_R(2L).

Then the processing unit PU processes bit after bit the successive bits of the master random number M_R(2L) to determine successively, according to the principle of the method as previously disclosed, which one of the branches SP1 or SP2 to execute by each successive processing unit cycles depending on the 0 or 1 value of each scanned bit. For each bit of the master random number M_R(2L), executing a processing unit cycle for the branch determined according to the bit value.

In a case of a sensitive computation having two branches, each composed of 16 loops, an example of pseudo code of countermeasure is herein below given:

```
// Random value of 16 bits
    Val_16Bits <= Random Value of 16 bits
    // 32bits value composed by concatenation of Val_16bits and
complemented
    // bits value of Val_16Bits. This construction assures that all
    // iterations will be executed.
        MasterRNG___32Bits <= Val_16Bits | ~(Val_16Bits) (in this step,
'~' operator computes the 2-Complement of a variable and '|' represents
the concatenation of two variables)
        bLoopTreatment_1 = bLoopTreatment_2 = 0
        For Loop = 0 to (16+16)
            - if Bit (MasterRNG_32Bits) == 1
                - Execute sensitive branch 1 (in random order)
                - Increment (bLoopTreatment_1, 1)
            - if Bit (MasterRNG_32Bits) == 0
                - Execute sensitive branch 2 (in random order)
                - Increment (bLoopTreatment_2, 1)
            - go to next bit of MasterRNG_32Bits
    // Control consistency
        - All bits of MasterRNG should be treated:
                if not ErrorDetected( )
        - Loop == 32 ?
                if not ErrorDetected( )
        - bLoopTreatment_1 == 16 ?
                if not ErrorDetected( )
        - bLoopTreatment_2 == 16 ?
                if not ErrorDetected( ).
```

By picking a random value for MasterRNG at each execution of the sensitive computation, the order of execution of sensitive first branch and sensitive second branch cannot be guessed. By construction of the master random, the whole sensitive computation will be executed. If branches can be equilibrated in order to necessitate the same number of CPU cycles, the branch effectively taken cannot be spied. By incrementing a different counter of execution in each sensitive branch, multiple tests to assure correctness can be easily implemented. Those tests include the check that all bits of the master random are treated the check that global loop index should be the sum of the necessitated CPU cycles for each of the branches, the check that each branch counter should be the number of necessitated CPU cycles, etc.

Then, an example of the generalization to several branches is given below. According to the method of the invention, at least as many identifiers as the number of branches are generated. They are each associated to one of the branches.

Preferably, as far as possible, identifiers are constructed as values and complemented values. In case of an odd number of branches, a non completed identifier is created or a branch is added with fake computations.

For example for four branches, the identifiers are 00, 01, 10 and 11. Branches are associated as follows: A=>00, B=>01, C=>10, D=>11.

Then the method of the invention comprises the step to randomly determining a sequence of the two first identifiers 00 and 01 having as many occurrences of each identifier as there are central processing unit time units in the shortest branch. Then the complemented sequence is computed. This complemented sequence is added at the end of the first sequence or interlaced with the first sequence. Equivalent ways of doing include to pack all identifiers together with as many occurrences as time units in the shortest branch. Advantageously, the branches are previously completed in order to be all of the same length. For example, with three CPU time units in all branches: 00 00 00 01 01 01 10 10 10 11 11 11. Then a random permutation is generated, for example 4, 0, 10, 6, 5, 8, 11, 2, 3, 7, 1, 9 and applied to the pack of identifiers. Applied to (00 00 00 01 01 01 10 10 10 11 11 11), it gives (01 00 11 10 01 10 11 00 01 10 00 11) which is a master random according to the invention.

Then the identifiers are read from the master random. The processing unit executes a CPU time unit for the corresponding branch. The master random (01 00 11 10 01 10 11 00 01 10 00 11) thus gives the following, sequence of branches: B A D C B C D A B C A D.

It is here noted that, in the preferred embodiment where two branches are used, the generated identifiers are the simplest ones, i.e. 0 and 1.

Figure 3:
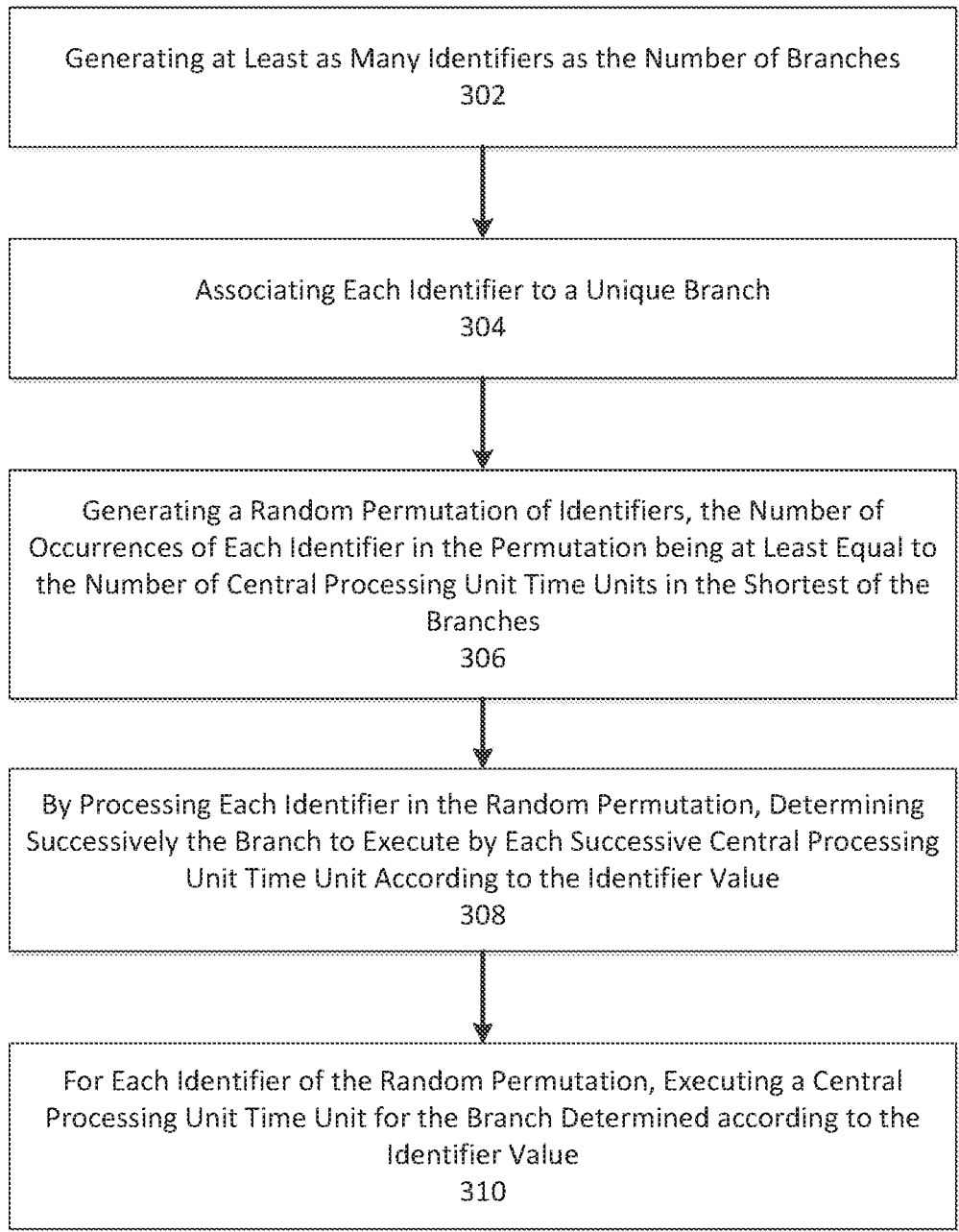
FIGS. 3 and 4 represent a flow chart and device block diagram, respectively, according to aspects described herein.

FIG. 3 is flowchart representing a method to execute by a processing unit a sensitive computation using multiple different and independent branches each necessitating a given number of processing unit time units to be executed. The method includes the following steps at each execution of a sensitive computation. At step 302, a device generates at least as many identifiers as the number of branches. At step 304, the device associates each identifier to a unique branch. At step 306, the device generates a random permutation of identifiers. The number of occurrences of each identifier in the permutation is at least equal to the number of central processing unit time units in the shortest of the branches. At step 308, the device, by processing each identifier in the random permutation, determines successively the branch to execute by each successive central processing unit time unit according to the identifier value. At step 310, the device, for each identifier of the random permutation, executes a central processing unit time unit for the branch determined according to the identifier value.

Figure 4:
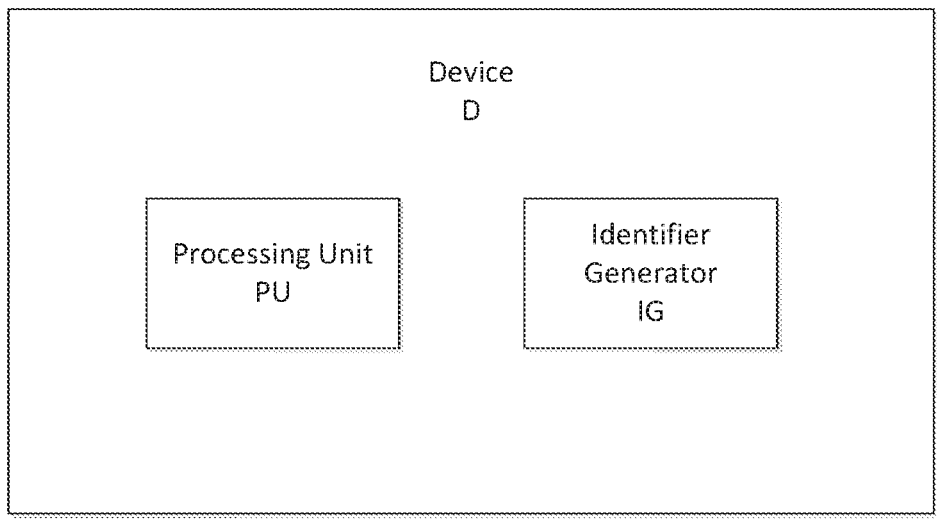

FIG. 4 is device block diagram according to aspects described herein. A device D includes a processing unit PU to execute a sensitive computation using multiple different and independent branches each necessitating a given number of processing unit time units to be executed. The device D includes an identifier generator IG to generate at least as many identifiers as the number of branches. Each identifier is associated to a unique branch. The processing unit PU is configured to compute a random permutation of identifiers. The number of occurrences of each identifier in the permutation is at least equal to the number of central processing unit time units in the shortest of the branches. The processing unit PU processes each identifier in the random permutation to determine successively the branch to execute by each successive central processing unit time unit according to the identifier value. The processing unit PU, for each identifier of the random permutation, executes a central processing unit time unit for the branch determined according to the identifier value.

As a conclusion the invention consists on a software countermeasure that assures the correct and complete execution of at least two branches of sensitive treatment in non predictable way.

Indeed, by construction of the countermeasure, there is no possibility to guess which branch will be taken a priori, there is no possibility to know which branch has been effectively taken by spying the device, for example through side channel exploitation, the countermeasure assures that the whole sensitive treatments, i.e. all branches, have effectively be executed, the countermeasure opens the possibility to fully mix the execution of several sensitive branches.

It is to be understood that the location or arrangement of individual elements within disclosed embodiment may be modified without departing from the scope of the invention. The above detailed description is, therefore, not to be taken in a limiting sense, and the scope of the present invention is defined only by the appended claims, appropriately interpreted along with the full range of equivalents to which the claims are entitled.

The invention claimed is:

1. Method to execute by a processing unit a sensitive computation using multiple different and independent branches each necessitating a given number of processing unit time units to be executed, the method comprising the following steps of, at each execution of the sensitive computation:
   generating at least as many identifiers as the multiple different and independent branches are in number, this step of generating a random permutation of identifiers being such that identifiers comprise at least a value and its complemented value,
   associating each identifier to a unique branch,
   generating a random permutation of identifiers, the number of occurrences of each identifier in the permutation being at least equal to the number of processing unit time units in a shortest of the multiple different and independent branches, this step of generating a random permutation is such that, first, a sequence of values as identifiers is generated, this sequence being then completed by complemented values of the sequence,
   by processing each identifier in the random permutation, determining successively a branch to execute for each successive processing unit time unit according to the identifier in the random permutation,
   for each identifier of the random permutation, executing a processing unit time unit for the branch determined according to the identifier in the random permutation,
   said method being such that, in the case one of the multiple different and independent branches is of different length, the method comprises a preliminary step of completing shortest one or more branches with additional processing unit time units to equilibrate the length of the multiple different and independent branches.

2. Method to execute a sensitive computation according to claim 1, wherein the sequence is completed by inserting the complemented values one out of two values in a previously generated sequence.

3. Method to execute a sensitive computation according to claim 1, wherein the sequence is completed by adjunction of the sequence of complemented values at the end of the sequence of values.

4. Method according to claim 1, wherein, the sensitive computation comprises different and independent branches of a cryptographic algorithm.

5. Method according to claim 1, wherein the sensitive computation is a countermeasure rerunning or implementing extra code to assure the correctness of the execution of the branch.

6. Method according to claim 1, further including the step of counting the number of processing unit time units associated with the execution of the branch.

7. Method according to claim 1, further including the step of independently counting, for each of the multiple different and independent branches, the number of processing unit time units associated with executing the corresponding branch.

8. Method to execute the sensitive computation according to claim 1, said sensitive computation using two different and independent branches each necessitating a given number of processing unit time units to be executed, comprising the following steps of:
   generating a random number as a succession of bits, the number of bits in the random number being at least equal to the number of processing unit time units in the shortest of the two different and independent branches,
   doubling the length of the random number using complemented bits of the generated random number to construct a master random number,
   by processing the master random number bit after bit, determining successively which one of the two different and independent branches to execute for each successive processing unit time unit depending on the 0 or 1 value of each bit of the master random number, each value being associated to one of the two different and independent branches,
   for each bit of the master random number, executing a processing unit time unit for the branch determined according to the bit value.

9. Method according to claim 8, wherein both branches necessitating the same number of processing unit time units, the number of bits of the generated random number is equal to a number of processing unit time units in one branch.

10. Method according to claim 8, further including the step of counting a number of scanned bits in the master random number.

11. Device comprising a processing unit to execute a sensitive computation using multiple different and independent branches each necessitating a given number of processing unit time units to be executed, said device further comprising an identifier generator to generate at least as many identifiers as the multiple different and independent branches are in number, each identifier being associated to a unique branch of the multiple different and independent branches, the generation of identifiers being such that the identifiers comprise a value and its complemented value, said processing unit being configured to compute a random permutation of identifiers, the number of occurrences of each identifier in the permutation being at least equal to the number of processing unit time units in a shortest of the multiple different and independent branches, this generation of random permutation of identifiers being such that identifiers comprise at least a value and its complemented value,
   said processing unit processing each identifier in the random permutation, to determine successively the branch to execute for each successive processing unit time unit according to the identifier in the random permutation and, for each identifier of the random permutation, executing a processing unit time unit for the branch determined according to the identifier in the random permutation.

12. Device according to claim 11, said device comprising a processing unit to execute a sensitive computation using two different and independent branches each necessitating a given number of processing unit time units to be executed, said device further comprising or being connected to a random number generator to generate a random number as successive bits, a number of bits in the random number being at least equal to the number of processing unit time units in the shortest of the two different and independent branches, said processing unit being configured to compute the complement of the given random number, said processing unit processing, bit after bit, the successive bits of the random number and of successive complemented bits of the generated random number, this succession of bits and complemented bits forming a master random number, to determine successively which one of the two different and independent branches to execute for each successive processing unit time unit depending on the 0 or 1 value of each scanned bit and, for each bit of the master random number, executing a processing unit time unit for the branch determined according to the bit value.

\* \* \* \* \*